United States Patent [19]

Andrews

[11] 3,715,373
[45] Feb. 6, 1973

[54] PREPARATION OF 1,4-DIAMINO-2-ALKOXY (PHENOXY)-ANTHRAQUINONES

[75] Inventor: David Arthur Andrews, Upper Montclair, N.J.

[73] Assignee: Toms River Chemical Corporation, Toms River, N.J.

[22] Filed: Jan. 21, 1970

[21] Appl. No.: 4,738

Related U.S. Application Data

[63] Continuation-in-part of Ser. No. 730,639, May 20, 1968, abandoned.

[52] U.S. Cl. ................................. 260/380, 260/377
[51] Int. Cl. ........................................... C09b 1/54
[58] Field of Search ................................... 200/380

[56] References Cited

UNITED STATES PATENTS 2,492,743   12/1949   Grossmann ........................... 260/380

3,178,455   4/1965   Grossmann et al. .................. 260/380

OTHER PUBLICATIONS

Houben–Weyl–Methoden Der Organische Chemie, 11/1 pp. 985–986, (1957)
Tommila et al., Acta Chem. Scand 17, 1947 (1963)
Smith, The Chemistry of Open–Chain Organs Nitrogen Compounds, Volume I, p. 188–189; (1965)

*Primary Examiner*—Lorraine A. Weinberger
*Assistant Examiner*—Robert Gerstl
*Attorney*—Harry Goldsmith, Joseph G. Kolodny and Mario A. Monaco

[57] ABSTRACT

1,4-diamino-2-alkoxy (or phenoxy) anthraquinones are prepared by heating an acyl-substituted 1,4-diamino-2-haloanthraquinone in the presence of an alkali alkoxide (or phenoxide) in a solvent. The products formed are valuable dyestuffs.

10 Claims, No Drawings

PREPARATION OF 1,4-DIAMINO-2-ALKOXY (PHENOXY)-ANTHRAQUINONES

This application is a continuation-in-part of application Ser. No. 730,639, filed May 20, 1968, now abandoned.

BACKGROUND OF THE INVENTION 1,4-diamino-2-alkoxy (or phenoxy) anthraquinones are valuable dyestuffs employed for dyeing and printing synthetic fibers, particularly acetates, nylons, polypropylenes and polyethyleneterephthalate fibers. These compounds provide dyeings and prints having good all-around fastness properties. Heretofore, the method for the preparation of these compounds comprised condensing a 1-amino-4-bromo-2-anthraquinone-sulfonic acid with p-toluene sulfonamide, replacing the sulfonic acid group by an alkoxy group and subsequently hydrolyzing.

The present invention relates to the preparation of a 1,4-diamino-2-alkoxy (or phenoxy) anthraquinone by heating an acyl-substituted 1,4-diamino-2-haloanthraquinone in the presence of an alkali alkoxide (or phenoxide) in a substantially non-aqueous medium. It has surprisingly been found that, in this reaction, not only does a displacement of the 2-halo moiety with an alkoxy (or phenoxy) group occur, but also deacylation of the substituted amino moieties. It has also surprisingly been found that practical and economical yields of products can be obtained when the reaction has been carried out within certain temperature ranges. For example, if the reaction is carried out below about 65° C., not only are the yields low, but also the products are found difficult to isolate from the by-products. Also, when temperatures above about 150° C. and usually above about 130° C. are employed, low yields and difficult isolation is similarly encountered. This latter observation is particularly surprising, since one would expect that higher yields can be obtained if temperatures are increased, and this is particularly true in view of prior art which teaches, for example, that, in order to deacylate a 1-amino-5-benzamido anthraquinone, concentrated aqueous caustic conditions are required as well as temperatures above 200° C.

FIELD OF THE INVENTION

In accordance with this invention, therefore, 1,4-diamino-2-alkoxy (or phenoxy) anthraquinones can be prepared both in high yields and purity by heating an acyl-substituted 1,4-diamino-2-haloanthraquinone compound in the presence of an alkali metal alkoxide (or phenoxide) in a substantially non-aqueous medium. The starting materials may be represented by the following structural formula:

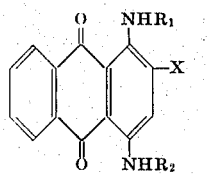

In the process of this invention the acyl group ($R_1$ and/or $R_2$) on the starting material is removed while the 2-halo moiety is replaced and, therefore, the type of acyl group on the starting material is not critical to the invention. Accordingly, $R_1$ and $R_2$ may be hydrogen or any acyl group, preferably an aroyl such as benzoyl and substituted benzoyl wherein the substituent does not interfere in the reaction, such as lower alkoxy, lower alkyl and the like, or an aliphatic acyl, such as alkanoyl from one to seven carbon atoms, such as acetyl, propionyl, pentanoyl and the like or a substituted alkanoyl as described above for the aroyl group; at least one of $R_1$ and $R_2$ must be other than hydrogen at any one time; and X is halogen, such as chlorine, bromine or iodine. In the most preferred aspects of this invention, $R_1$ is hydrogen and $R_2$ is benzoyl or alkanoyl, such as acetyl, and X is chloro or bromo. Representative starting materials of the invention are 1-amino-4-benzamido-2-chloroanthraquinone, 1-amino-4-benzamido-2-bromoanthraquinone, 2-chloro-1,4-dibenzamidoanthraquinone, 4-amino-1-benzamido-2-chloroanthraquinone and 1-amino-4-acetamido-2-chloroanthraquinone.

The reaction is suitably carried out in the presence of an alkali metal alkoxide (or phenoxide) such as sodium methoxide or phenoxide, potassium methoxide or phenoxide, sodium ethoxide, sodium butoxide and the like; and preferably sodium methoxide or potassium methoxide. The alkoxy group of the alkali metal alkoxide may be derived from an alkyl moiety of up to seven carbon atoms, such as methyl, butyl, pentyl and the like. The alkali moiety may be sodium, potassium or lithium. The alkali metal alkoxide (or phenoxide) is suitably employed in a ratio of from about 1.0 to about 10 equivalents per equivalent of starting anthraquinone compound, and preferably from about three to about eight equivalents per equivalent of anthraquinone compound.

The alkali metal alkoxide (or phenoxide) may be added to the reaction mixture as such or, if desired, may, under appropriate conditions, be prepared in situ. For example, when an alcohol is used as a solvent, solid alkali metal or alkali hydroxide may be added to the alcohol solvent to generate the desired alkali metal alkoxide.

The reaction is suitably carried out at a temperature from about 65° C. to about 150° C. until the reaction is complete (approximately 1 to 48 hours and preferably 10 to 24 hours); but preferably between about 80° and about 130° C. In an especially preferred embodiment of this invention, extremely high yields are obtained when the reaction is carried out at a temperature of between about 90° and about 120° C.

The reaction is suitably carried out in the presence of an alcohol corresponding to the alkoxy group desired on the 2-position of the final product, or may be carried out in an inert solvent, such as dioxane, dimethylsulfoxide, benzene, toluene, xylene, chlorobenzene, o-dichlorobenzene, mixtures thereof and the like. Preferably, the reaction is carried out in dimethylsulfoxide or in the alcohol corresponding to the alkoxy group desired on the final product. The use of dimethylsulfoxide as solvent is still another particular embodiment of this invention, for it has been found that, when using dimethylsulfoxide as solvent, higher yields are obtained than with other solvents or with alcohols, when the reactions are carried out at the same temperatures. Although in another preferred embodiment of this invention the reaction is carried out under essentially anhydrous conditions, that is, less than about 3 percent of water to total volume, the reaction may, nonetheless, be carried out in the presence of amounts of water, of up to about 20 percent to total volume and preferably up to about 10 percent water, if water is desired, without substantially adversely affecting the yield of product desired or the temperature at which the reaction is to occur.

The following examples are given by way of illustration:

EXAMPLE 1

To 171 parts of 1-amino-4-benzamidoanthraquinone in 1800 parts of nitrobenzene is added dropwise over 3 hours at 65°–70° C., 78 parts of sulfuryl chloride. After stirring for a further half hour at 65°–70° C. the mixture is cooled to room temperature, 20 parts soda ash added and the product isolated by filtration. The residual nitrobenzene is removed by steam distillation, the product filtered and the cake washed neutral with water and then dried. The yield of 1-amino-4-benzamido-2-chloroanthraquinone is 143 parts having m.p. 249°–251° C. and chlorine content, 9.9 percent (Theoretical chlorine 9.4 percent).

Similarly, when 1,4-dibenzamidoanthraquinone, 1-amino-4-acetamidoanthraquinone or 1-amino-4-butylamidoanthraquinone is used in place of 1-amino-4-benzamidoanthraquinone in the above example, there is obtained the corresponding 1,4-dibenzamido, 1-amino-4-acetamido or 1-amino-4-butylamido-2-chloroanthraquinone.

Similarly, when sulfuryl bromide is used in place of sulfuryl chloride in the above example, there is obtained the corresponding 1-amino-4-benzamido-2-bromoanthraquinone.

EXAMPLE 2

Twenty parts of 1-amino-4-benzamido-2-chloroanthraquinone is added to 400 parts methanol in a one liter autoclave. After adding 20 parts of sodium methoxide, the temperature is raised to 100° C. and held at this level for 20 hours. On cooling, the mixture is discharged from the autoclave. The product is isolated by distilling off 350 parts of alcohol while simultaneously adding 100 parts of water followed by filtration. The presscake is washed neutral with hot water and dried. The yield of 1,4-diamino-2-methoxyanthraquinone is 12.4 parts, m.p. 227°–234° C. and chlorine content 0.4 percent; thin layer shows it to be free of significant impurities and a paste dyes cellulose acetate and synthetic fibers in a bright pink shade.

The following results are obtained when the above example is carried out under the indicated temperatures:

| Temp. | Yield of Pure Product, in Parts — Theory — 14.2 |
| --- | --- |
| 65 | 5.4 |
| 80 | 9.0 |
| 90 | 12.8 |
| 100 | 12.4 |
| 120 | 11.4 |
| 130 | 10.0 |

Similarly, when 2-chloro-1,4-dibenzamidoanthraquinone, 4-acetamido-1-amino-2-chloroanthraquinone, 1-amino-4-butylamido-2-chloroanthraquinone or 1-amino-4-benzamido-2-bromoanthraquinone is used in place of 1-amino-4-benzamido-2-chloroanthraquinone in the above example, there is obtained 1,4-diamino-2-methoxyanthraquinone (in the case of the disubstituted amino compounds, 40 parts of sodium methoxide are employed).

EXAMPLE 3

Twelve parts sodium methoxide and 18.8 parts of 1-amino-4-benzamido-2-chloroanthraquinone is dissolved in 100 parts dimethylsulfoxide at 70° C. After holding at 70° C. for 12 hours, 100 parts of water is added dropwise at 70° C. The product is filtered off at room temperature and washed neutral with hot water. The dry yield of chromatographically pure 1,4-diamino-2-methoxyanthraquinone is 9.9 parts; m.p. 237°–238.5° C: chlorine content 0.3 percent.

Similarly, when the above example is carried out at 80°, 90° or 100° C. for 6, 3 or 1.5 hours respectively, instead of 70° C. for 12 hours, similar results are obtained.

EXAMPLE 4

A mixture of 100 parts monochlorobenzene, 5 parts sodium methoxide and 5 parts 1-amino-4-benzamido-2-chloroanthraquinone is heated at 100° C. for 24 hours before cooling to room temperature. The product is filtered off, washed with chlorobenzene and steam distilled chlorobenzene free. The product dyes synthetic fibers a similar shade to the product from Example 2.

Similarly, when o-dichlorobenzene, benzene, toluene or dioxane is used in place of chlorobenzene in the above example, similar results are obtained.

EXAMPLE 5

Four hundred parts of ethanol are placed in a 1 liter flask and 7 parts freshly cut sodium metal is added slowly. When all the sodium has dissolved, 20 parts of 1-amino-4-benzamido-2-chloroanthraquinone is added and stirred to a smooth slurry. The mixture is transferred to a 1 liter autoclave with 100 parts ethanol, heated to 100° C. and held at this temperature for 20 hours. 450 parts ethanol are distilled off while simultaneously adding 100 parts of water. The product is filtered off and washed neutral giving a high yield of essentially pure 1,4-diamino-2-ethoxyanthraquinone; m.p. 224°–227.5° C; chlorine content 0.2 percent. The product dyes synthetic fibers a bright pink shade.

Similarly, when methanol, propanol, pentanol, hexanol or heptanol is used in place of ethanol in the above example, similar results are obtained.

EXAMPLE 6

A one liter autoclave is charged with 400 parts methanol, 62.5 parts 1-amino-4-benzamido-2-chloroanthraquinone and 40 parts potassium hydroxide. The mixture is heated at 95° C. for 20 hours and then cooled to room temperature. The product is filtered off, washed neutral and dried. This material, m.p. 243.5°–245° C., dyes acetate in a bright pink shade.

Similarly, when sodium hydroxide is used in place of potassium hydroxide in the above example, similar results are obtained.

EXAMPLE 7

To a melt of 5 parts sodium phenoxide in 100 parts phenol is added 5 parts 1-amino-4-benzamido-2-chloro-anthraquinone. The mixture is heated to 150°C. and held at this temperature for 12 hours. The mixture is then cooled to 70°C. and 100 parts methanol added dropwise. The product is isolated by filtering at room temperature. The presscake is washed with 50 parts methanol and then made phenol free with warm water. The product, 1,4-diamino-2-phenoxyanthraquinone, dyes synthetic fibers a bright pink shade.

Similarly, when the above reaction is carried out at 130°, 100° or 90°C., similar results are obtained.

Similarly, when phenol is replaced with dimethylsulfoxide, benzene or chlorobenzene, similar results are obtained.

EXAMPLE 8

1,4-Dibenzamido-2-Chloroanthraquinone

Into a 1 liter resin kettle is charged 250 parts nitrobenzene and 50 parts soda ash. To this is added over 30–45 minutes 78 parts of 1-amino-2-chloro-4-benzamidoanthraquinone. After heating to 130°C. 44 parts of benzoyl chloride are added uniformly over 3 hours at 130°–135° C. The mixture is then stirred at 130°–135° C. for 3 hours before cooling to room temperature and filtering. The press-cake is then washed three times with 50 parts nitrobenzene and then steam distilled nitrobenzene free. The product is isolated by filtering, washing neutral to congo red paper and drying.

I claim:

1. A process for preparing a compound of the formula:

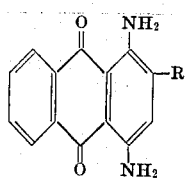

wherein R is alkoxy of from 1-7 carbon atoms or phenoxy, which comprises treating a compound of the formula:

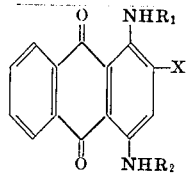

wherein $R_1$ and $R_2$ are each hydrogen or acyl selected from the group consisting of benzoyl and $C_{1-7}$ alkanoyl or substituted benzoyl or $C_{1-7}$ alkanoyl wherein the substituents are selected from the group consisting of lower alkoxy and lower alkyl, at least one of $R_1$ and $R_2$ being acyl at any one time; and X is halogen; with an alkali alkoxide or alkali phenoxide in the presence of an alcohol selected from the group consisting of phenol and alkanol of from one to seven carbon atoms; or in an inert solvent at temperatures of from about 65° C. to about 150° C.

2. The process of claim 1 wherein R is methoxy.

3. The process of claim 1 wherein R is methoxy, $R_1$ is hydrogen, and X is chloro or bromo.

4. The process of claim 1 wherein R is methoxy, $R_1$ is hydrogen, and X is chloro or bromo.

5. The process of claim 1 wherein the reaction is carried out in alcohol at a temperature of from about 90 to about 120°C.

6. The process of claim 1 wherein R is methoxy, $R_1$ is hydrogen, $R_2$ is benzoyl, X is chloro or bromo and the reaction is carried out in a methanol solvent.

7. The process of claim 6 wherein the reaction is carried out between about 90° to about 120°C.

8. The process of claim 1 wherein dimethylsulfoxide is employed as the inert solvent.

9. The process of claim 1 wherein the alkali alkoxide or phenoxide is prepared in situ.

10. The process of claim 1 wherein up to about 20 percent by volume of water is present in the reaction mixture.

* * * * *